US011054144B2

(12) United States Patent
Berling

(10) Patent No.: US 11,054,144 B2
(45) Date of Patent: Jul. 6, 2021

(54) EXTRACTOR DEVICE WITH AIR INTAKE

(71) Applicant: Berling Aero IP UG, Isernhagen (DE)

(72) Inventor: Udo Berling, Hopsten (DE)

(73) Assignee: Inovvida Aero IP UG, Arnsberg (DE)

( * ) Notice: Subject to any disclaimer, the term of this patent is extended or adjusted under 35 U.S.C. 154(b) by 295 days.

(21) Appl. No.: 16/333,670

(22) PCT Filed: Sep. 13, 2017

(86) PCT No.: PCT/EP2017/073060
§ 371 (c)(1),
(2) Date: May 16, 2019

(87) PCT Pub. No.: WO2018/050719
PCT Pub. Date: Mar. 22, 2018

(65) Prior Publication Data
US 2020/0278118 A1 Sep. 3, 2020

(30) Foreign Application Priority Data
Sep. 16, 2016 (DE) .......................... 102016117537.4

(51) Int. Cl.
F24C 15/20 (2006.01)
B01D 45/14 (2006.01)
B01D 50/00 (2006.01)

(52) U.S. Cl.
CPC .......... F24C 15/2042 (2013.01); B01D 45/14 (2013.01); B01D 50/002 (2013.01); F24C 15/2021 (2013.01); F24C 15/2035 (2013.01)

(58) Field of Classification Search
CPC .............. F24C 15/2042; F24C 15/2021; F24C 15/2035; B01D 45/14
See application file for complete search history.

(56) References Cited

U.S. PATENT DOCUMENTS 2,554,694 A 5/1951 Belt
2,674,991 A 4/1954 Schaefer
6,715,484 B2* 4/2004 Khosropour ........ F24C 15/2035
126/299 D (Continued)

FOREIGN PATENT DOCUMENTS

CN 105545771 A 5/2016
DE 102007051942 A1 4/2009

OTHER PUBLICATIONS

International Search Report dated Nov. 15, 2017, International Application No. PCT/EP2017/073060 filed Sep. 13, 2017.

Primary Examiner — David J Laux
Assistant Examiner — Nikhil P Mashruwala
(74) Attorney, Agent, or Firm — Dinsmore & Shohl LLP

(57) ABSTRACT

The invention relates to an extractor device comprising a centrifugal blower (16) as an extraction fan (6), with an upwards suction opening (14) facing the hob (8), around which an annular space (20) is formed. The first air-guiding channel (10) flows into the suction opening (14) of the centrifugal blower (16). The annular space (20) comprises a side wall (22) by means of which the discharge air flow leaving the centrifugal blower (16) is deflected. A collecting vessel (24) is embodied in a second plane below the centrifugal blower (16), for collecting particles bounding off the side wall (22), and the discharge air flow flows out of the annular space (2) in a second air-guiding channel (28) out of the extraction fan (6).

11 Claims, 4 Drawing Sheets

(56) References Cited

U.S. PATENT DOCUMENTS

| | | | | |
|---|---|---|---|---|
| 7,687,748 | B2* | 3/2010 | Gagas | H05B 6/1263 |
| | | | | 219/623 |
| 7,836,877 | B2* | 11/2010 | Gagas | F24C 15/2092 |
| | | | | 126/299 D |
| 8,312,873 | B2* | 11/2012 | Gagas | F24C 15/2092 |
| | | | | 126/299 D |
| 9,746,188 | B2* | 8/2017 | Worrell | F24C 15/2042 |
| 10,006,641 | B2* | 6/2018 | Bruckbauer | F24C 15/2035 |
| 10,549,227 | B2* | 2/2020 | Adam | B01D 46/0031 |
| 10,712,019 | B2* | 7/2020 | Adam | F24C 15/14 |
| 10,718,528 | B2* | 7/2020 | Bruckbauer | F24C 15/2035 |
| 10,900,665 | B2* | 1/2021 | Flesch | F24C 15/2042 |
| 2002/0182060 | A1 | 12/2002 | Chou et al. | |
| 2014/0048057 | A1 | 2/2014 | Bruckbauer | |
| 2020/0094180 | A1* | 3/2020 | Adam | F24C 15/32 |

* cited by examiner

EXTRACTOR DEVICE WITH AIR INTAKE

CROSS-REFERENCE TO RELATED APPLICATIONS

This application is the U.S. national stage of PCT/EP2017/073060 filed Sep. 13, 2017, which claims priority of German Patent Application 10 2016 117 537.4 filed Sep. 16, 2016 of which is hereby incorporated by reference in its entirety.

FIELD OF THE INVENTION

The present invention relates to an extractor device with a first air-guiding channel having a mouth opening, which is in a first plane positioned onto or above the plane of the hob, wherein the first air-guiding channel diverts the sucked-in discharge air into an area below the plane of a hob, and the first air-guiding channel is connected with an extraction fan arranged in a second plane below said hob.

BACKGROUND OF THE INVENTION

U.S. Pat. No. 5,884,619 discloses a generic extractor device. Unlike extractor devices being arranged above a hob and sucking off discharge air rising from the hob, from above, the extractor device disclosed herein provides an air-guiding channel having a mouth opening positioned approximately above the plane of the hob and guiding the discharge air downwards. In a plane below the hob, the extraction fan is arranged, by means of which the discharge air is sucked in and blown out via an exhaust channel. The advantage of this arrangement is that the space above the hob remains free and is not blocked by a voluminous extractor device. It is easier for the cock to look into the pots and hitting the head against protruding components of the extractor device is avoided.

DE 10 2011 015 360 A1 discloses an extractor device with a housing having a centrifugal blower arranged in it, which sucks a discharge air flow through a suction opening, accelerating it and blowing it out through mouth openings between the vanes into an air-guiding channel annularly encompassing the centrifugal blower. The advantage of the centrifugal blower installed in the extractor device is that the discharge air flow between the vanes is extremely accelerated and afterwards deflected in such a sharp manner that any particles floating in the discharge air, in particular fat and oil molecules, are thereby separated at the side wall of the annular space shaped around the outer circumference of the centrifugal blower. In this way, the discharge air remains almost free of oil or fat particles, which makes this extractor device especially suitable for the recirculation mode and the use of discharge air filters, which no longer need to be changed and/or cleaned so frequently. However, this kind of extractor device is only provided for being mounted above a hob.

SUMMARY OF THE INVENTION

The object of the present invention is to provide an extractor device, which is arranged below a hob and also realizes high separation degrees for fat and oil particles.

The object is solved for a generic extractor device by providing an extraction fan which has a centrifugal blower being arranged in the second plane below the hob, wherein the suction opening of the centrifugal blower faces upwards to the hob and the first air-guiding channel opens in the suction opening of the centrifugal blower, wherein around the centrifugal blower, a closed annular space is shaped, annularly encompassing the centrifugal blower and directed upwards to the hob, wherein discharged air flowing between the vanes out of the centrifugal blower, flows into said annular space, which has a side wall spaced apart from the outer circumference of the centrifugal blower, by means of which the airflow, leaving the centrifugal blower in an at least approximately radial direction towards the rotation axis of the centrifugal blower, is deflected into a flow direction being at least approximately axial towards the rotation axis, and wherein in a third plane below the centrifugal blower a collection vessel for collecting particles running off at the side wall is provided, wherein the discharge airflow flows out of the annular space in a second air-guiding channel out of the extraction fan.

Arranging the centrifugal blower according to the invention in a second plane below the hob allows using the technical advantages of a centrifugal blower also in this installation situation. By means of connecting the first air-guiding channel, which guides the discharge air from the hob downwards, on the top, the discharge air needs not to be guided laterally around the centrifugal blower. While flowing through the rotationally driven centrifugal blower, the discharge air can be accelerated as previously known. During the subsequent deflection of the discharge air flowing out of the centrifugal blower, fat and oil particles can be separated from the discharge air flow, being collected at the side wall of the annular space, as also previously known.

By means of arranging the collecting vessel below said centrifugal blower, not only gravitation, but also the transporting effect of the discharge air flow flowing along the side wall can be utilized for transporting oils and fats sticking to the side wall into the direction of the collecting vessel. In order to prevent the flow direction of the discharge air flow and that of the oils and fats dropping from the side wall from crossing one another, it is advantageous to guide the discharge air flow through an air-guiding channel, which turns the discharge air flow into a flow direction facing away from the collecting vessel, causing the discharge air flow escaping from the extraction fan only afterwards. In this way, oil and fat can be collected in the collecting vessel without running the risk that the discharge air flow reabsorbs some of these previously separated particles.

If in the present description an axial or radial direction is mentioned, these terms exclusively refer to the rotation axis of the centrifugal blower.

In one embodiment of the invention, said first air-guiding channel is formed of multiple parts having at least one upper and one lower channel component, at the facing ends of said channel components plug-in couplings are provided, via which said channel components can be airtightly connected with one another in a toolessly detachable manner, and said upper channel component, where the mouth opening is formed, can optionally be plugged with its end facing away from the mouth opening through the plane of the hob into the plug-in coupling of a lower channel component ending below the plane of said hob. In case cooking is made with the hob, or in case cooking is made without guiding the produced cooking fumes via the extractor device, an upper end of an air-guiding channel having a mouth opening shaped at its end can hamper kitchen work. In such cases it would be desirable, if the upper channel component could be removed from its operating position. This can easily be realized according to the invention by simply removing the upper channel component from the plug-in coupling of the other lower channel component and storing it during nonuse in a place not causing discomfort, as for example in a lower kitchen cabinet. After removal of the upper channel component, there are no more hampering components protruding beyond the hob and a surrounding work surface. A cook can work more comfortably and use almost his complete work surface without noticing the upper channel component. If the extractor device is needed again, it is sufficient to plug said upper channel component with its plug-in coupling shaped at its lower end into the plug-in coupling of the upper end of said lower channel component, such that said upper channel component returns to its operating position again. Advantageously, plug-in couplings are formed such that detaching and connecting the parts of said plug-in couplings is as simple as possible, as for example by means of conically shaped ends. Connecting and detaching the components possibly without using a tool simplifies everyday use. Special tools are for example not required, if said channel components are connected with one another via latching or clamping connections or via bayonet fittings. To prevent loss of performance and the accumulation of condensed water in the lower cabinet, said plug-in couplings should be designed as airtight and even waterproof as possible.

According to an embodiment of the invention, a retention sleeve is firmly connected with said hob and said surrounding work surface, said retention sleeve having an opening of size and form corresponding to the outer circumference of the upper channel component, wherein the retention sleeve forms a guiding aid for inserting the lower end of the upper channel component into the plug-in coupling of the lower channel component ending below the plane of the hob. Inserting and removing the upper channel component is simplified, if it is pulled out of or plugged into a retention sleeve, which is firmly connected with the hob and/or the work surface. For this purpose, said retention sleeve can be a guiding aid which simplifies a tension-free pulling out or plugging in of the plug-in couplings. Said retention sleeve is also advantageous in case of installing a kitchen for the first time, as tolerances between the shape of the outer circumference of the upper channel component and the opening to be cut into a work surface or into the hob can be balanced by means of such retention sleeve. While the shape and size of the opening for receiving the upper channel component in said retention sleeve exactly fit to the shape and size of the upper channel component, the components of said retention sleeve, serving to provide a connection to the work surface or to the hob, can be designed such that they may cover greater tolerances in the dimensions of the required cutout in the work surface or the hob.

According to an embodiment of the invention, said opening of said retention sleeve can be locked by a cover, if said upper channel component is not inserted into said retention sleeve and into said plug-in coupling of said lower channel component ending below the plane of the hob. Said cover can be provided as a special component, or it is integrally connected with the retention sleeve, for example via a hinge or a film hinge. Locking the opening in said retention sleeve prevents food scraps or other dirt from falling through the opening into the lower cabinet or centrifugal blower positioned underneath, when work is done on the hob or the work surface and the upper channel component has been removed.

According to an embodiment of the invention, said upper channel component is formed as a pipe elbow, the lower shaft of which can be plugged in vertical direction onto the upper end of a lower channel component and the central portion of which and/or the end facing the mouth opening having a curvature. In case of the curved form, at least the part of the upper channel component starting from the curvature protrudes over the plane of the hob. This, however, has the advantage that regarding height and transversal direction, the mouth opening can be guided closer to the steam outlet of a pot and thus to the source of the air to be discharged. In case of rotationally moving said upper channel component around the vertical axis of the first air-guiding channel, around which said upper channel component may be movable, it is also possible to align the mouth opening on one or more specific pots. This entirely increases the suction efficiency of the extractor device. Said upper channel component can be formed integrally, or even additional plug-in parts or telescopic end pieces are available, by means of which said mouth opening can be shifted into the desired position in even more exact and versatile ways. Furthermore, a set of various upper channel components of differing length, height or curvature having mouth openings of differing forms can be part of one extractor device, which can be selected and applied according to the use requirements.

According to an embodiment of the invention, said centrifugal blower is installed in a lower cabinet in the second plane below the hob inside a drawer, which can be shifted from a use position inside said lower cabinet into a maintenance position outside said lower cabinet. By means of installing the centrifugal blower inside a drawer, it is more easily accessible, when it has to be maintained or cleaned. This is particularly important as the centrifugal blower can separate greater quantities of oil and fat from the discharge air during operation and therefore has to be cleaned more often than conventional extractor devices.

According to an embodiment of the invention, said upper channel component in its plug-in position locks the centrifugal blower and the drawer in the use position. It is advantageous to lock said centrifugal blower in the use position, in order to avoid incorrect operation and malfunction. In order to secure that said centrifugal blower can be operated only when said upper channel component is in its use position, a mechanical or electrical contact can be connected with the electronic control of the extractor device. It is only possible to switch on the centrifugal blower when said mechanical or electrical contact indicates that said upper channel component is in its operating position According to an embodiment of the invention, between the centrifugal blower and the collection vessel, a disconnection point is provided via which said centrifugal blower is connected with said collection vessel in a toollessly detachable manner. Such disconnection point allows for cleaning purposes to firstly only remove the centrifugal blower from its operating position and clean it. Having removed the centrifugal blower from its operating position, allows to check easily at one glance, whether the collection vessel has to be cleaned and therefore removed from its installation position, too. Only in case that an intense cleaning seems to be necessary, said collection vessel also has to be removed from its operating position and cleaned. In this case as well, the detaching or connecting of the components with one another can for example be made via latching or clamping connections or via bayonet fittings.

According to an embodiment of the invention, said collection vessel is connected with the drawer in a toollessly detachable manner. The afore-mentioned description applies to said toollessly detachable connection.

According to an embodiment of the invention, said centrifugal blower blows out of the second guiding channel into the interior of a lower cabinet, the interior of which is airtightly sealed against the adjoining components and in the area of the access opening, wherein said lower cabinet has a discharge opening comprising a filter unit. Said filter unit can be arranged behind, but also in front of the discharge opening, it is especially preferable to arrange a filter unit in front of the discharge opening inside the lower cabinet. Compared to the free cross section of the second air-guiding channel, the free cross-section surface inside said lower cabinet provides an enlargement of the flow space available for the discharge flow, which causes a slowdown of the flow speed. Due to the airtight sealing of the interior of the lower cabinet, the discharge air can leave the lower cabinet only via the discharge opening. Due to the sealing, a slight overpressure can occur inside said lower cabinet during operation. If said discharge opening is provided with a filter unit, this filter unit can filter the complete discharged air being moved by the centrifugal blower. The air can flow through said filter unit being arranged in the enlarged flow space inside said lower cabinet with a relatively slow flow speed due to the enlarged flow cross-section. The slowed-down air flow increases the separation performance of the filter unit.

According to an embodiment of the invention, said filter unit consists of at least one layer of a filter material which is arranged extensively. Said extensive arrangement of the filter material means an arrangement with a cross-sectional surface larger than the flow cross-section of the second air-guiding channel. Said filter unit can for example extend over the full height or partial height of the interior of said lower cabinet and over the full or partial width of the interior of said lower cabinet. In case of an inclination, the height or width of the interior of said lower cabinet can even be exceeded. As filter material for example activated carbon can be used, which has a high specific surface area. Activated carbon can filter out of the discharge flow for example odor molecules very effectively. However, instead of activated carbon, other filter materials as for example paper filters, can also be used. Apart from arranging the filter material extensively, it can also be applied in multiple layers or in one thick layer.

According to an embodiment of the invention, one plug-in coupling is provided with an electrical contact which is designed as a sensor and/or power connector. If said electrical contact is designed as a sensor, the extractor device can be switched on or off by means of contacting it. By means of said signal of the electrical contact, a locking of the lower cabinet can also be controlled, via which said lower cabinet is locked, when the upper channel component is plugged into the operating position. Correspondingly, the putting into operating can be blocked, when said electrical contact signalizes no contact with the plugged-in channel component although the extraction fan is in operation. If said electrical contact is provided as power supply, a lighting device attached at the channel component can be powered by it, which can directly light up into the pots on the hob. Via said power supply, even a charging station for a smart device like a mobile phone, a cordless phone, a screen or a tablet computer can be powered. Even electrical kitchen devices like a mixer, a coffee machine or the like can be powered via said power supply.

It is also expressly indicated that each of the afore described embodiments according to the invention can be used individually, but also in any combination of single, various or all other embodiments with the object of the main and sub claims, unless this is opposed by any compelling technical background.

Further variations and embodiments of the invention can be taken from the following representational description and the drawings.

The invention is now to be described in more detail based on one exemplary embodiment. The drawings show:

DETAILED DESCRIPTION OF THE PREFERRED EMBODIMENT

Figure 1:
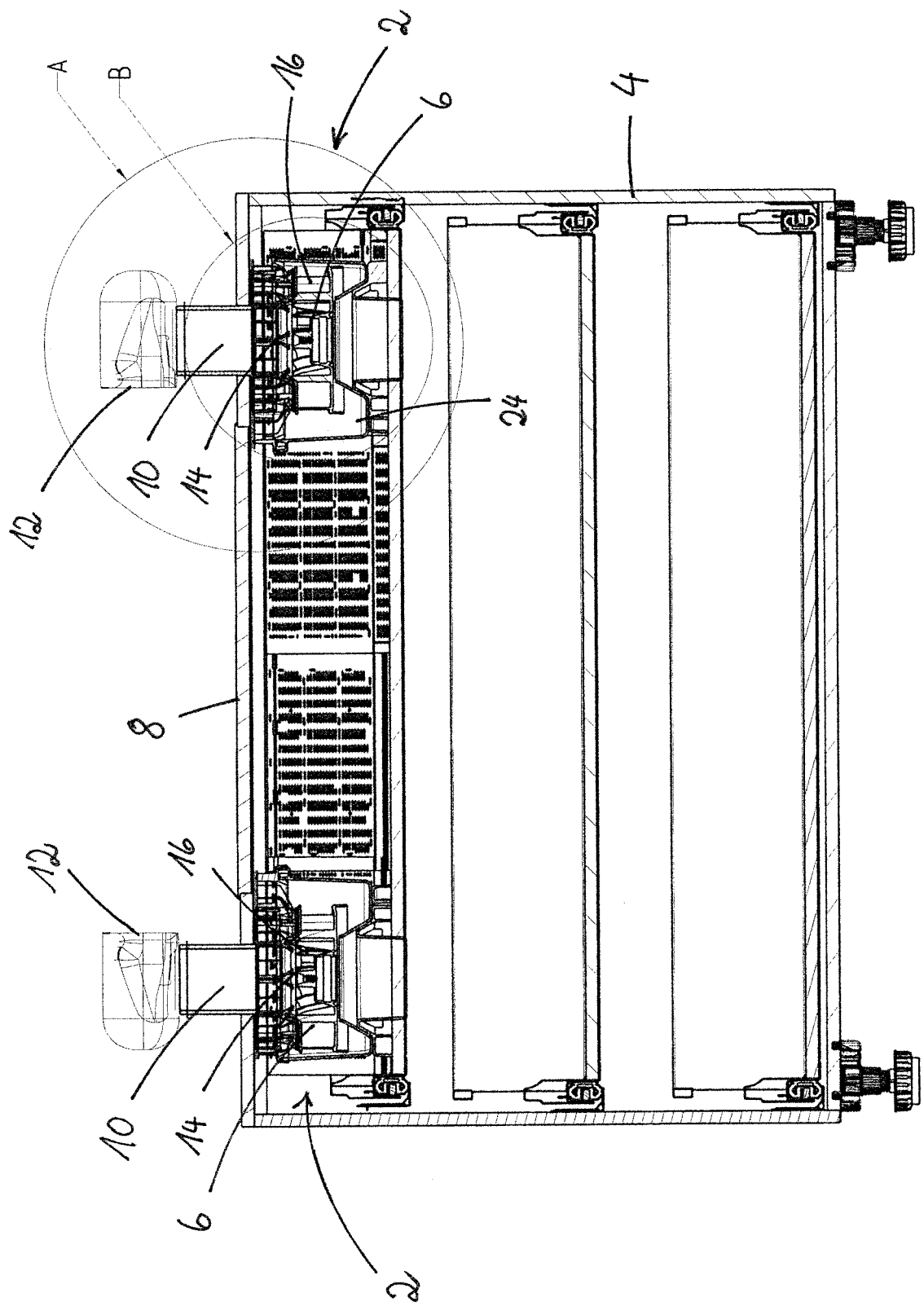
FIG. 1: a sectional view onto a lower cabinet, with two extractor devices installed into it.

FIG. 1 shows a lower cabinet 4, with two extractor devices 2 installed into it. Each extractor device 2 comprises an extraction fan 6. The two extractor devices 2 are arranged on the right and left side of a hob 8. In the two extractor devices 2, the discharge air is guided through a first air-guiding channel 10 from a mouth opening 12 on the side of the hob 8 to the suction opening 14 of each of the centrifugal blowers 16. The exemplary embodiment shows two extractor devices 2 for one hob 8, although it is also possible to discharge the discharge air only with one single extractor device 2. The mouth openings 12 are positioned inside a housing which is plugged onto a shaft arranged below the housing. The housings having the mouth opening 12 are rotatably plugged onto the shaft piece. The housings can of course also be designed in a different form which is not shown in the figures of the exemplary embodiment.

Figure 2:
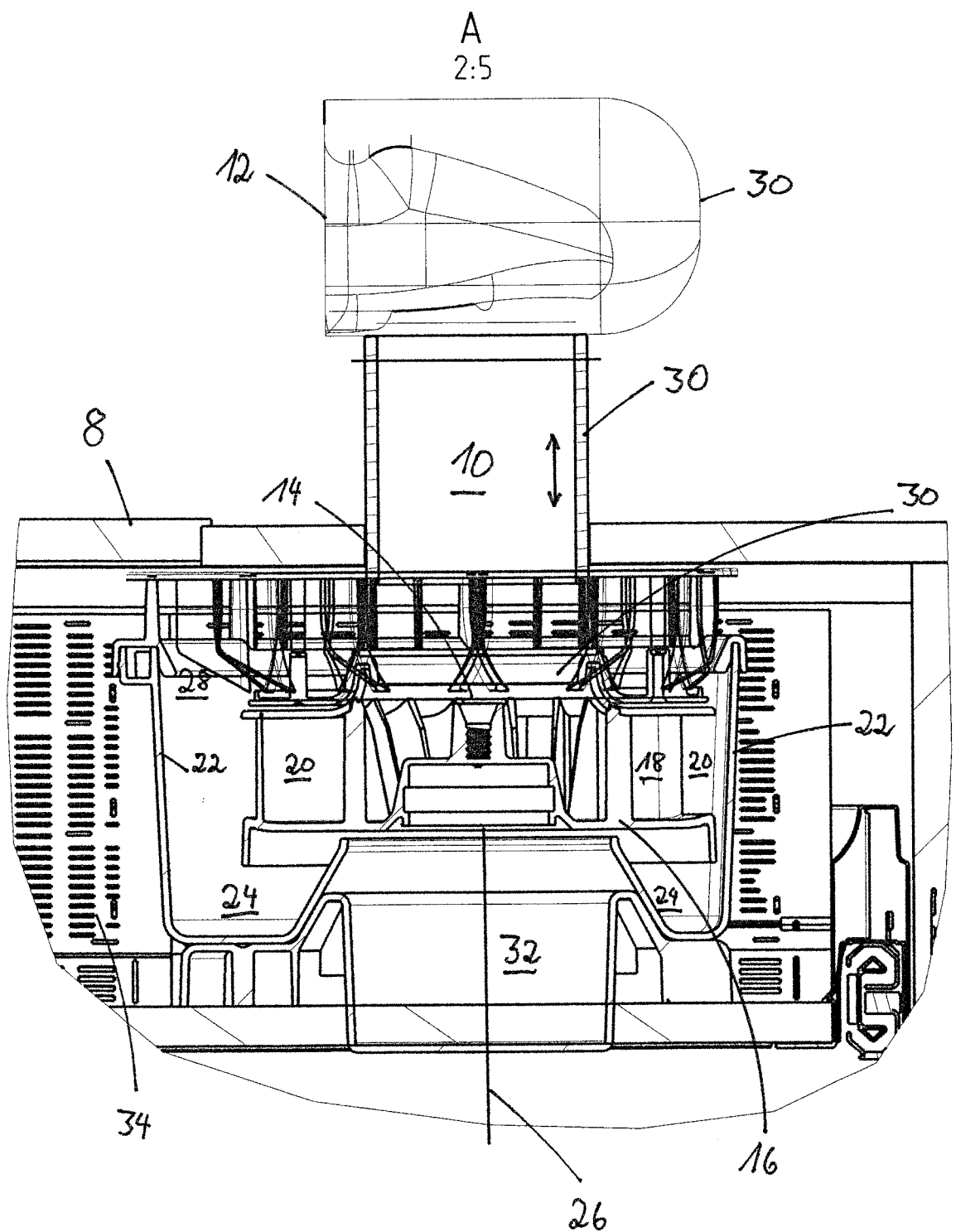
FIG. 2: an enlarged view of the circle A from FIG. 1,
FIG. 3: an enlarged view of the circle B from FIG. 1, and
FIG. 4: a sectional side view of the extractor device as shown in FIG. 1-3.
Figure 3:
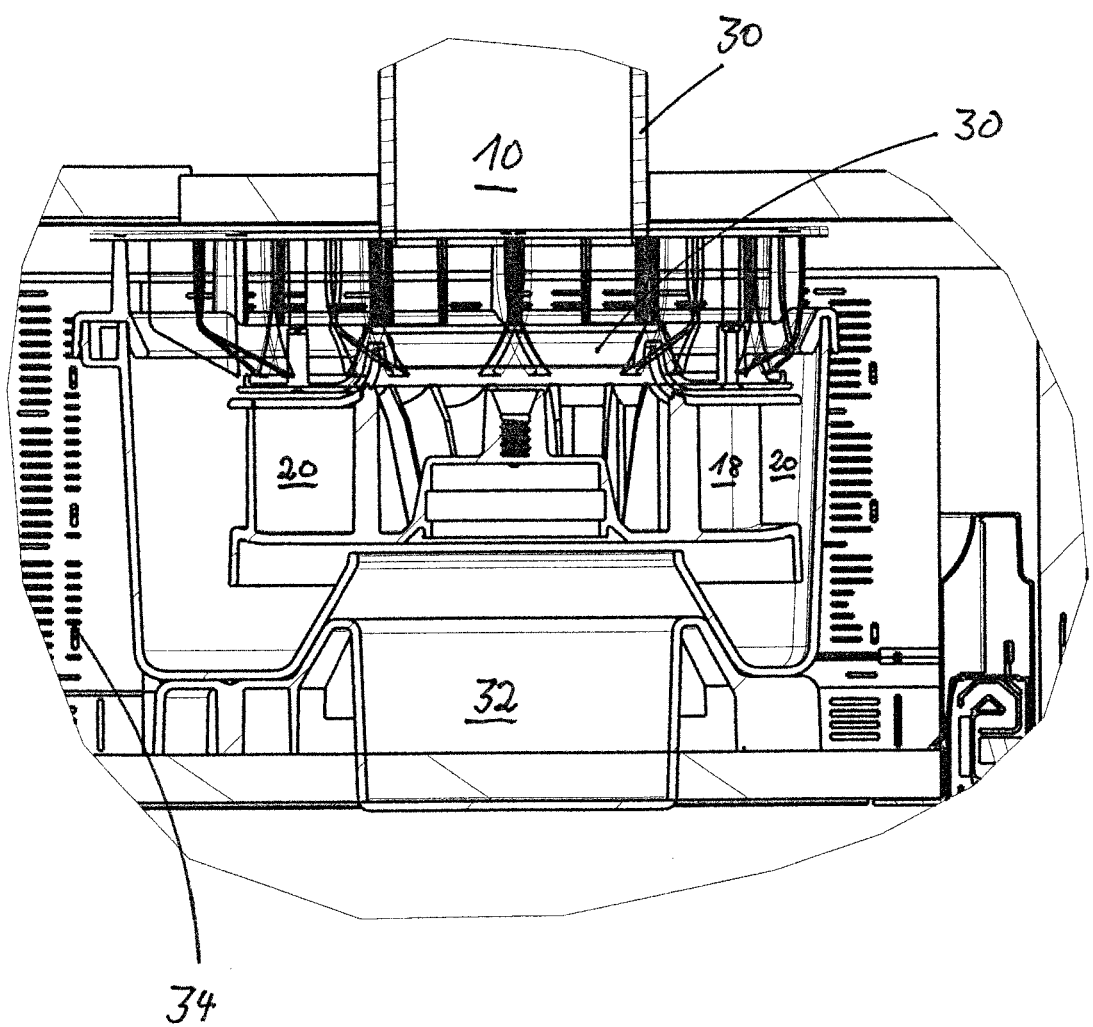

More exact details about the design of the extraction fan 6 can be taken from the enlarged views A and B from FIG. 1, which are shown in the FIGS. 2 and 3.

FIG. 1 shows that the two extraction fans 6 are constructed in a very compact manner and can therefore be housed inside a drawer of a lower kitchen cabinet 4. For maintenance purposes, the centrifugal blowers 16 can be pulled out of the lower cabinet 4 with the drawer. The centrifugal blower 16 of the extraction fan 6 can then be removed from its installation position in the drawer by moving it slightly upwards. The collection vessel 24 can be removed slightly upwards out of the drawer in the same manner, for being cleaned.

FIG. 2 shows the centrifugal blower 16 in an enlarged view. The centrifugal blower 16 comprises a number of vanes 18 for sucking the discharge air flow from the mouth opening 12 through the first air-guiding channel 10 into the suction opening 14, where the discharge air flow enters the through-flow spaces between the vanes 18. In this area, the discharge air flow is accelerated by the special interior design of the vanes 18. From the through-flow spaces, the discharge air flow enters the annular space 20 in an approximately axial direction, where it is again deflected into an at least approximately axial direction by the side wall 22. During the deflection, particles being moved with the discharge air flow, as for example fats or oil drops, are projected to the side wall 22, where they stick and drop down into the collection vessel 24. The centrifugal blower 16 rotates with high speed around the rotation axis 26. The discharge air flow inside the annular space 20 flows upwardly through the second air-guiding channel 28 through the slots visible there into the interior of the lower cabinet 4. As the annular space 20 is designed in a closed construction downwardly due to the collection vessel 24, the discharge air flow can only escape upwardly via the second air-guiding channel 28.

In the background of the extraction fan 6 in the FIGS. 1 to 4, a filter unit 34 is indicated. The interior of the lower cabinet 4 can be airtightly sealed towards the outside when the drawer is closed, such that discharge air flow blown into the interior of the lower cabinet 4 can only escape from the interior by flowing through the filter unit 34, behind which an air vent is located within the body of the lower cabinet 4. Inside the filter unit 34, a filter medium is arranged for filtering large molecules and other substances out of the air being unwanted substances in the discharge air of the extractor device 2. The filter unit 34 is particularly interesting in cases where the extractor device 2 is operated in recirculation mode. But even for the discharge operation mode it can be appropriate to provide a filter unit 34.

Below the centrifugal blower 14, a motor housing 32 is positioned within which the drive motor for the centrifugal blower 16 can be arranged.

In FIGS. 2 and 3 it can be seen that the first air-guiding channel 10 is composed of multiple channel components 30. According to the exemplary embodiment, it is composed of the upper housing having the mouth opening 12, the central channel component 30 as well as a collar piece located as the lower channel component 30 in the area of the suction opening 14 of the centrifugal blower 16. The single channel components 30 are connected with one another via plug-in couplings. They can be separated from one another preferably without using a tool. This allows removing the channel components 30 from the working surface besides the hob 8 in a quick and simple manner, such that the surface can afterwards be used as a plane surface for kitchen work. If the channel components 30 are not needed, they can be placed inside the drawer of the lower cabinet 4, where also the extraction fan 6 is accommodated.

When according to the exemplary embodiment, the upper housing 30 and the central channel component 30 are removed from the operating position, the slot to the centrifugal blower 16, which then opens, can be locked by a corresponding cover. Not shown in the drawings in more detail is a retention sleeve into which the central channel component 30 is pushed downwards through the plane of the hob 8 and the adjacent working surface.

If the upper housing 30 and the central channel component 30 are designed in one piece, the two portions together form the upper channel component 30. In the sense of the present description and the claims, the central channel component 30 as shown in FIGS. 2 and 3, forming a tube-like portion, is also an upper channel component 30. The removability of the upper channel component 30 is indicated in FIG. 2 with the double arrow drawn in the area of the channel component 30.

The enlarged views in FIGS. 2 and 3 show that the channel component 30 extending down to the area of the suction opening 14 of the centrifugal blower 16, in a plug-in position into the working surface fixes the centrifugal blower 16 in its installation position. The centrifugal blower 16 can no longer be pulled with the drawer out of the kitchen cabinet 4, as such pull-out movement is blocked by means of the positive fitting of the upper channel component 30 in the work surface. In this way, the upper channel component 30 provides a securing against pulling out the centrifugal blower 16 when the upper channel component 30 is plugged in.

Between the centrifugal blower 16 and the collection vessel 24, a disconnection point is provided via which said centrifugal blower 16 is connected with said collection vessel 24 in a toollessly detachable manner. The disconnection point can for example be the drive shaft of the drive motor, from which the centrifugal blower 16 can be removed in a simple manner. In the exemplary embodiment, the drive shaft also engages through a recess inside the collection vessel 24.

Figure 4:
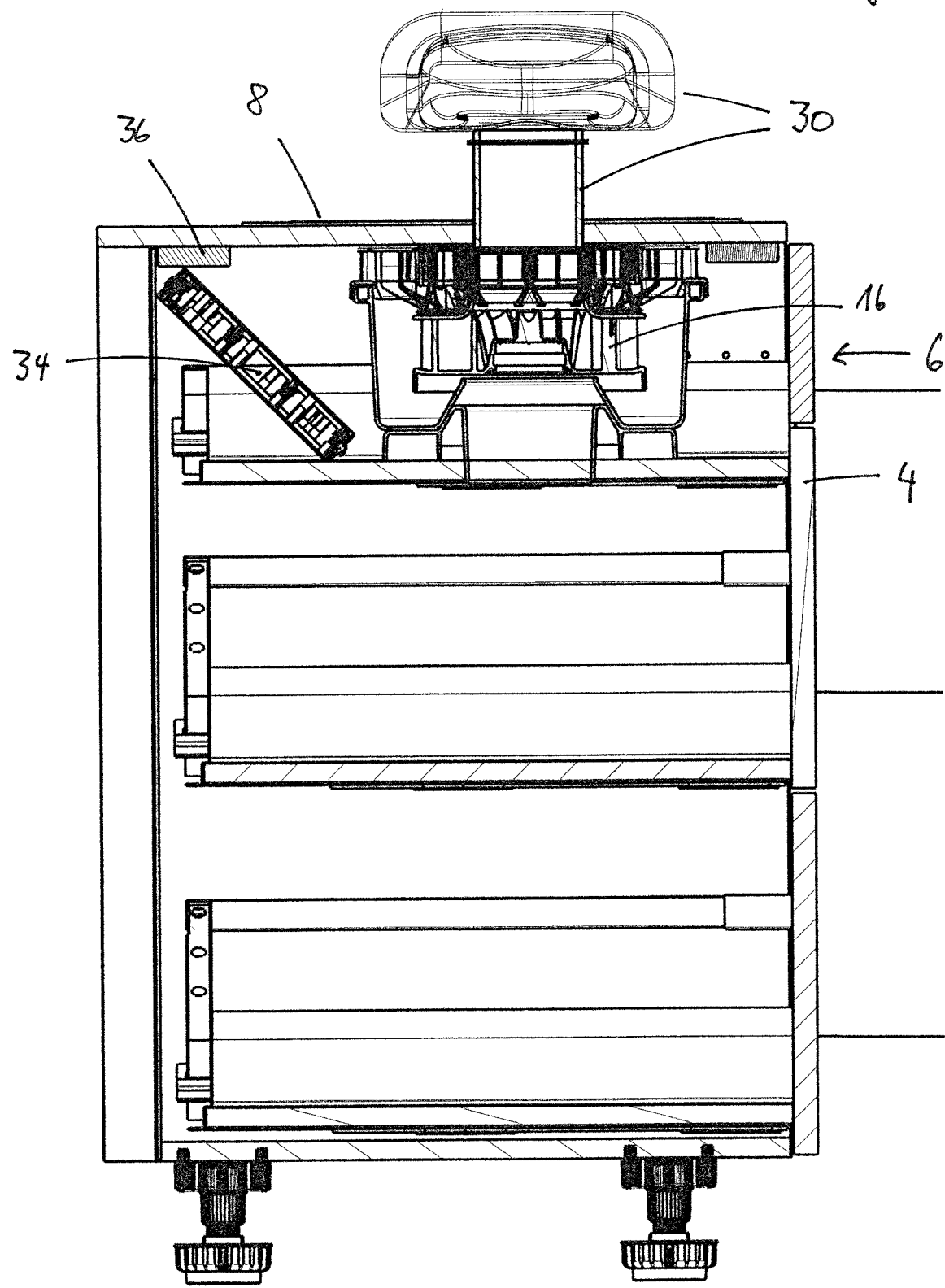

FIG. 4 shows the extractor device illustrated in FIGS. 1 to 3 from a side view. In the side view, the upper channel components 30 are clearly visible. However, the side view in particular shows that the filter unit 34 is arranged obliquely inside the lower cabinet 4. This oblique arrangement saves installation space in height. By means of attaching the filter unit 34 at a sealing component 36 being connected with the lower cabinet 4, the interior of the lower cabinet 4, in which the two extraction fans 6 are arranged, is sealed airtightly.

The above representational description only serves to explain the invention. The invention is not limited to the described exemplary embodiment. For a person skilled in the art it is not difficult to adapt the invention to a specific case of application by modifying the exemplary embodiment in a manner appearing appropriate to her/him.

The invention claimed is:

1. An extractor device comprising a first air-guiding channel, having a mouth opening, which is in a first plane positioned onto or above the plane of a hob, wherein the first air-guiding channel discharges sucked-in discharge air into an area below the plane of a hob, and a centrifugal blower is connected with the first air-guiding channel positioned in a second plane below said hob, wherein a suction opening of the centrifugal blower faces upwards to the hob and said first air-guiding channel opens in the suction opening of the centrifugal blower, wherein, a closed annular space is shaped, around the centrifugal blower to annularly encompass the centrifugal blower and directed upwards to the hob, wherein the discharge airflow flowing between the vanes out of the centrifugal blower flows into said annular space, which has a side wall spaced apart from the outer circumference of the centrifugal blower, by means of which the airflow, leaving the centrifugal blower in an at least approximately radial direction towards the rotation axis of the centrifugal blower, is deflected into a flow direction being at least approximately axial towards the rotation axis, and wherein in a third plane below the centrifugal blower a collection vessel for collecting particles running off at the side wall is provided, wherein the discharge airflow flows out A of the annular space in a second air-guiding channel the centrifugal blower installed in a drawer in a lower cabinet on the second plane below the hob, wherein the drawer can be shifted from a use position inside the lower cabinet on the second plane below the hob into a maintenance position outside the lower cabinet.

2. The extractor device according to claim 1, wherein the first air-guiding channel is formed of multiple parts having at least one upper and one lower channel component, the channel components having plug-in couplings, via which said channel components can be airtightly connected with each other in a toollessly detachable manner, and said upper channel component, where the mouth opening is formed, can optionally be plugged with its end facing away from the mouth opening through the plane of the hob into the plug-in coupling of a lower channel component ending below the plane of said hob.

3. The extractor device according to claim 2, wherein a retention sleeve is firmly connected with the hob or with a work surface surrounding said hob, having an opening of size and form corresponding to the outer circumference of the upper channel component, wherein the retention sleeve forms a guiding aid for inserting the lower end of the upper channel component into the plug-in coupling of the lower channel component ending below the plane of the hob.

4. The extractor device according to claim 3, wherein an opening of the retention sleeve can be locked with a cover, when said upper channel component is not plugged into the retention sleeve and the plug-in coupling of said lower channel component ends below the plane of the hob.

5. The extractor device according to claim 4 wherein a disconnection point is provided between the centrifugal blower and the collection vessel via which said centrifugal blower is connected with said collection vessel in a toollessly detachable manner.

6. The extractor device according to claim 5 wherein the collection vessel is connected with the drawer in a toollessly detachable manner.

7. The extractor device according to claim 1 wherein the upper channel component is shaped as a pipe elbow, a lower shaft of which can be plugged in vertical direction onto the upper end of a lower channel component and a central portion of which and/or an end facing the mouth opening having a curvature.

8. The extractor device according to claim 1 wherein the upper channel component when in a plug-in position locks the centrifugal blower and the drawer in the use position.

9. The extractor device according to claim 1 wherein said centrifugal blower blows out of the second guiding channel into an interior of a lower cabinet, the interior of the lower cabinet is airtightly sealed against the adjoining components and in the area of an access opening, wherein the lower cabinet has a discharge opening having a filter unit.

10. The extractor device according to claim 9, wherein the filter unit has at least one layer of a filter material.

11. The extractor device according to claim 1 wherein a plug-in coupling is provided with an electrical contact which is designed as a sensor and/or power connector.

* * * * *